United States Patent
Alharizah et al.

(10) Patent No.: US 10,865,264 B2
(45) Date of Patent: *Dec. 15, 2020

(54) HYDROXYETHYLPYRROLIDONE METHACRYLATE/GLYCIDYL METHACRYLATE COPOLYMERS

(71) Applicant: ISP INVESTMENTS LLC, Wilmington, DE (US)

(72) Inventors: Alaa Alharizah, Dover, NJ (US); Michael A. Tallon, Aberdeen, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/777,011

(22) PCT Filed: May 16, 2016

(86) PCT No.: PCT/US2016/062155
§ 371 (c)(1),
(2) Date: May 17, 2018

(87) PCT Pub. No.: WO2017/087446
PCT Pub. Date: May 26, 2017

(65) Prior Publication Data
US 2018/0346627 A1    Dec. 6, 2018

Related U.S. Application Data

(60) Provisional application No. 62/257,880, filed on Nov. 20, 2015.

(51) Int. Cl.
*C08F 220/36* (2006.01)
*C08F 220/32* (2006.01)

(52) U.S. Cl.
CPC .......... *C08F 220/36* (2013.01); *C08F 220/32* (2013.01)

(58) Field of Classification Search
CPC .................................................. C08F 220/36
See application file for complete search history.

(56) References Cited

U.S. PATENT DOCUMENTS 8,629,229 B2 * 1/2014 Hood ................ C08F 226/02
526/264
2012/0220741 A1  8/2012 Hood et al.
2014/0296441 A1  10/2014 Hood

FOREIGN PATENT DOCUMENTS

WO    WO2011063208 A1    5/2011

OTHER PUBLICATIONS

International Search Report, PCT/US2016/062155 published on May 26, 2017.

* cited by examiner

*Primary Examiner* — Golam M Shameem
(74) *Attorney, Agent, or Firm* — William J. Davis; Nathalie Tietcheu

(57) ABSTRACT

This invention provides reactive, flexible, water-resistant hydroxyethylpyrrolidone methacrylate/glycidyl methacrylate copolymers, or hydroxyethylpyrrolidone methacrylate/glycidyl methacrylate/-(Methacroyloxyglyceryl-Cellulosic) block copolymers. This invention provides hydroxyethylpyrrolidone methacrylate/glycidyl methacrylate copolymers having the structure: wherein x and y are mole %, the sum equals to 100, and wherein said copolymer is prepared by precipitation polymerization. The copolymer is useful in a wide variety of compositions.

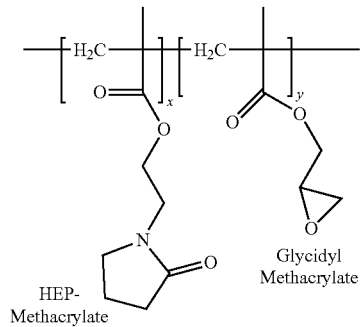

3 Claims, No Drawings

HYDROXYETHYLPYRROLIDONE METHACRYLATE/GLYCIDYL METHACRYLATE COPOLYMERS

FIELD OF THE INVENTION

This invention provides reactive, flexible, water-resistant hydroxyethylpyrrolidone methacrylate/glycidyl methacrylate copolymers. The copolymers may be covalently attached to active agents that are useful in a wide variety of compositions.

BACKGROUND OF THE INVENTION

The attachment of active agents to substrates using a variety of coating compositions is well known. A difficulty with the use of such compositions is that the active agents are leached from the substrates over time through a variety of means.

Polyvinylpyrrolidone (PVP) is a non-toxic, ecologically friendly, water and organic soluble, film-forming stiff polymer (high $T_g$), which has excellent adhesion to a variety of substrates, such as metal, hair, skin, porcelain, plastics, polyesters, paper, concrete, and clays. The carbonyl group in polyvinylpyrrolidones has the ability to hydrogen bond/complex both high molecular weight entities such as polyphenols, tannins, polyacids and low molecular weight entities such as active pharmaceutical ingredients (as a drug excipient), inks or dye-mordants, and mycotoxins.

Polyvinylpyrrolidone can be radical crosslinked by gamma-ray, x-ray, E-beam, UV-cured, and thermally activated by radical species to form an insoluble composite thereby rendering the PVP formulation as a hydrogel, or a surface treatment that is (semi)permanently affixed to the substrate on which it was coated. However, these crosslinking treatments require specialized equipment not readily available and the crosslinking conditions can damage other components in the formulation rendering them useless in the desired application.

While the carbonyl oxygen atom in polyvinylpyrrolidone is a strong hydrogen bond accepter, access to the oxygen atom is hindered due to the close proximity of the oxygen atom in the polymeric backbone. Applicants have found that extending the polyvinylpyrrolidone group away from the polymeric backbone on a pendant group results in less steric hindrance and better access to the oxygen atom.

U.S. Pat. No. 2,882,262A relates to a process for catalytically preparing (meth)acrylates of N-hydroxyalkylated lactams and to their use.

United States Publication no. 2013/0150481A1 realates to relates to compositions comprising a reactive monomer that are suitable for inks or ink coatings and processes for preparing the same.

German patent no. 2048312A1 relates to a method of protecting the surface of a final sized ferrous metal welding wire with an ultra-thin coating comprising a monomolecular layer formed by the chemical reaction of the wire surface with a rust inhibitor and a residual layer of oil covering the monomolecular layer.

U.S. Pat. No. 5,362,830A relates to relates to a method for making crosslinked polyvinylpyrrolidone (PVP) polymers by reaction between epoxide-containing PVP copolymers and tertiary-amine-containing PVP copolymers in solution at a predetermined temperature.

United States Publication no. 2010/0190947A1 relates to polyvinylamides containing polymerizable functionalities.

In view of the foregoing, there is a need for improved coating compositions and also there is a need for compositions that deliver active agents to substrates such that the active agents are not readily leached from the substrates over time.

SUMMARY OF THE INVENTION

The objective of the present application is to provide hydroxyethylpyrrolidone methacrylate/glycidyl methacrylate copolymers having the structure:

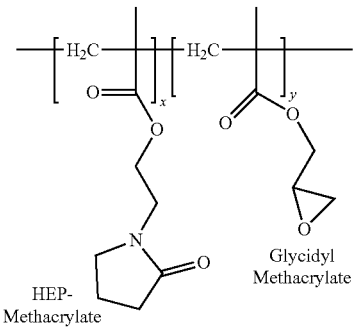

wherein x and y are mole %, the sum equals to 100, and wherein said copolymer is prepared by precipitation polymerization. Another objective of the present application is to prepare hydroxyethylpyrrolidone methacrylate/glycidyl methacrylate copolymers by precipitation polymerization. Also, one more objective of the current application is to provide a wide variety of compositions comprising the hydroxyethylpyrrolidone methacrylate/glycidyl methacrylate copolymers.

DETAILED DESCRIPTION OF THE INVENTION

The present invention provides hydroxyethylpyrrolidone methacrylate/glycidyl methacrylate copolymers having the structure:

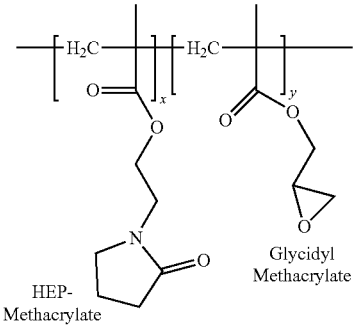

wherein x and y are mole %, the sum equals to 100, and wherein said copolymer is prepared by precipitation polymerization. The invention also provides compositions comprising the hydroxyethylpyrrolidone methacrylate/glycidyl methacrylate copolymers.

As used herein, the following terms, unless otherwise indicated, have the meanings set out below.

The term "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or."

The term "about" refers to a value that includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

The term "acryloyl" refers to a moiety having the generic structure:

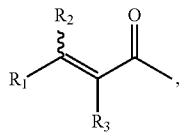

wherein each $R_1$, $R_2$, and $R_3$ is independently selected from the group consisting of hydrogen and functionalized and unfunctionalized alkyl, alkenyl, aryl, nitrile, formyl, carboxyl, carboxylate salt, carboxylic ester, carboxamide, halogen, thiocarboxylate, and combinations thereof.

The term "alkyl" refers to a functionalized or unfunctionalized monovalent straight-chain, branched-chain or cyclic $C_1$-$C_{60}$ group optionally having one or more heteroatoms. Particularly, an alkyl is a $C_1$-$C_{45}$ group and more particularly, a $C_1$-$C_{30}$ group. Particular, yet non-limiting examples of alkyl groups include methyl, ethyl, n-propyl, isopropyl, n-butyl, isobutyl, tert-butyl, cyclobutyl, n-pentyl, isopentyl, cyclopentyl, n-hexyl, cyclohexyl, n-heptyl, cyclyheptyl, methylcyclohexyl, n-octyl, 2-ethylhexyl, tert-octyl, iso-norbornyl, n-dodecyl, tert-dodecyl, n-tetradecyl, n-hexadecyl, n-octadecyl, and n-eicosyl.

The term "alkyl (alk) acrylate" refers to an alkyl ester of an acrylic acid or an alkyl acrylic acid.

The term "alkyl (alk) acrylamide" refers to an alkyl amide of an acrylic acid or an alkyl acrylic acid.

The term "alkylene" refers to a functionalized or unfunctionalized divalent straight-chain, branched-chain or cyclic $C_1$-$C_{40}$ group optionally having one or more heteroatoms. Particularly, an alkylene is a $C_1$-$C_{45}$ group and more particularly, a $C_1$-$C_{30}$ group. Particular, yet non-limiting examples of alkylene groups include —$CH_2$—. —$CH_2$—$CH_2$—, —$CH(CH_3)$—$CH_2$—, $CH_2$—$CH(CH_3)$—, —$C(CH_3)_2$—$CH_2$—, —$CH_2$—$C(CH_3)_2$—, —$CH(CH_3)$—$CH(CH_3)$—, —$C(CH_3)_2$—$C(CH_3)_2$—, —$CH_2$—$CH_2$—$CH_2$—, —$CH(CH_3)$—$CH_2$—$CH_2$—, —$CH_2$—$CH(CH_3)$—$CH_2$—, —$CH_2$—$CH_2$—$CH(CH_3)$—, —$CH_2$—$CH_2$—$CH_2$—$CH_2$—, —$CH_2$—$CH_2$—$CH_2$—$CH_2$—$CH_2$—, —$CH_2$—$CH_2$—$CH_2$—$CH_2$—$CH_2$—$CH_2$—, —$CH_2$—$CH_2$—$CH_2$—$CH_2$—$CH_2$—$CH_2$—$CH_2$—, cyclopropylene, cyclobutylene, cyclopentylene, cyclohexylene, and the like.

The term "at least one" refers to one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached.

The term "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, $B_{Xn}$, $B_{Xn+1}$, or combinations thereof" is intended to include at least one of: A, $B_{Xn}$, $B_{Xn+1}$, $AB_{Xn}$, A $B_{Xn+1}$, $B_{Xn}B_{Xn+1}$, or $AB_{Xn}B_{Xn+1}$ and, if order is important in a particular context, also $B_{Xn}A$, $B_{Xn+1}A$, $B_{Xn+1}$ $B_{Xn}$, $B_{Xn+1}B_{Xn}A$, $B_{Xn}B_{Xn+1}A$, $AB_{Xn+1}B_{Xn}$, $B_{Xn}AB_{Xn+1}$, or $B_{Xn}+AB_{Xn}$. Continuing with this example, expressly included are combinations that contain repeats of one or more item or term, such as $B_{Xn}B_{Xn}$, AAA, $MB_{Xn}$, $B_{Xn}B_{Xn}B_{Xn+1}$, $AAAB_{Xn}B_{Xn+1}B_{Xn+1}B_{Xn+1}B_{Xn+1}$, $B_{Xn+1}$ $B_{Xn}B_{Xn}AAA$, $B_{Xn+1}A$ $B_{Xn}AB_{Xn}B_{Xn}$, and so forth. The skilled artisan will understand that typically there is no limit on the number of items or terms in any combination, unless otherwise apparent from the context.

The term "branched and unbranched alkyl groups" refers to alkyl groups, which may be straight chained or branched. For example, the alkyl groups have from 1 to about 60 carbon atoms, more particularly, from 1 to about 30 carbon atoms, and yet more particularly from 1 to about 6 carbon atoms. Branched groups include isopropyl, tert-butyl, and the like.

The term "each independently selected from the group consisting of" refers to a group appears more than once in a structure, that group may be selected independently each time it appears.

The term "fast-dissolving solid form" refers to solid dosage forms that dissolve in less than about 60 seconds, preferably less than about 15 seconds, more preferably less than about 5 seconds, after placing the solid dosage form in the oral cavity.

The term "free radical addition polymerization initiator" refers to a compound used in a catalytic amount to initiate a free radical addition polymerization, and is used herein as simply "initiator". The term "free radical addition polymerization initiator" also refers to thermal and light activated initiators. The choice of "initiator" depends mainly upon its solubility and its decomposition temperature.

The term "functionalized" refers to the state of a moiety that has one or more functional groups introduced to it by way of one or more functionalization reactions known to a person having ordinary skill in the art. Particular, yet non-limiting examples of functionalization reactions include epoxidation, sulfonation, hydrolysis, amidation, esterification, hydroxylation, dihyroxylation, amination, ammonolysis, acylation, nitration, oxidation, dehydration, elimination, hydration, dehydrogenation, hydrogenation, acetalization, halogenation, dehydrohalogenation, Michael addition, aldol condensation, Canizzaro reaction, Mannich reaction, Clasien condensation, Suzuki coupling, and the like. Particularly, functionalization of a moiety replaces one or more hydrogens in the moiety with one or more non-hydrogen groups, for e.g., alkyl, alkoxyl, cycloalkyl, alkenyl, cycloalkenyl, alkynyl, and/or aryl groups. Particular, yet non-limiting examples of cycloalkyl groups include cyclopentane, cyclohexane, cycloheptane, and the like. Particular, yet non-limiting examples of alkoxy groups include methoxy, ethoxy, n-propoxy, isopropoxy, and the like. Particular, yet non-limiting examples of aryl groups include benzenes, naphthalenes (2 rings), anthracenes (3 rings), and the like.

The term "halogen" refers to chloro, bromo, iodo and fluoro, and in one embodiment is bromo and/or chloro.

The term "heteroatom" refers to atoms such as oxygen, nitrogen, sulfur, silicon, phosphorous, and/or halogen. The heteroatom(s) may be present as a part of one or more heteroatom-containing functional groups and/or as a part of one or more heterocyclic rings. Non-limiting examples of heteroatom-containing functional groups include ether, hydroxy, epoxy, carbonyl, carboxamide, carboxylic ester, carboxylic acid, imine, imide, amine, sulfonic, sulfonamide, phosphonic, and silane groups.

The term "hydrocarbyl" refers to a straight-chain and branched-chain alkyl, alkenyl, alkynyl, cycloalkyl, cycloalkenyl, aryl groups, and combinations thereof with optional heteroatom(s). A hydrocarbyl group may be mono-, di- or polyvalent.

The term "mineral acid" refers to an acid derived from one or more inorganic compounds. Mineral acids release hydrogen ions when dissolved in water. Commonly used mineral acids are sulfuric acid, hydrochloric acid, and nitric acid.

The term "non-aqueous" refers to a state of not being aqueous in nature. By "non-aqueous" it is generally meant that water is not deliberately added to the composition in any significant quantity. However, the term "non-aqueous" does not mean that small amounts of water cannot be present, for example as a consequence of its association with hygroscopic raw materials. Accordingly, for the purposes of this invention, the term "non-aqueous" generally refers to that water is present in an amount no greater than about 5%, more preferably no greater than about 3% by weight based on the total weight of the composition.

The term "organic moiety" refers to an unsubstituted or substituted alkyl, cycloalkyl, alkenyl, and aryl groups, wherein any of the before mentioned groups may be present with or without heteroatoms. The alkyl and alkenyl groups may be branched or unbranched (straight-chain). Preferably, the alkyl and alkenyl groups are $C_1$-$C_{60}$, more preferably $C_1$-$C_{36}$, and most preferably $C_1$-$C_{18}$ groups. Cycloalkyls (closed rings) include cyclopentane, cyclohexane, cycloheptane, and the like. Aryl groups include benzenes, naphthalenes (2 rings), and anthracenes (3 rings), and the like.

The term "personal care composition" refers to such illustrative non-limiting compositions as skin, sun, oil, hair, and preservative compositions, including those to alter the color and appearance of the skin.

The term "pH" refers to a measure of the acidity or basicity of an aqueous solution. Pure water is considered to be neutral, with a pH close to 7.0 at 25° C. Solutions with a pH less than 7 are considered to be acidic and solutions with a pH greater than 7 are considered to be basic or alkaline.

The term "polymer" refers to a large molecule comprising one or more types of monomer residues (repeating units) connected by covalent chemical bonds. By this definition, polymer encompasses compounds wherein the number of monomer units may range from very few, which more commonly may be called as oligomers, to very many Non-limiting examples of polymers include homopolymers, and non-homopolymers such as copolymers, terpolymers, tetrapolymers and the higher analogues. The polymer may have a random, block, and/or alternating architecture.

The term "monomer" refers to a small molecule, which is a repeating unit in polymer that chemically bonds during polymerization to one or more monomers of the same or different kind to form a polymer.

The term "homopolymer" refers to a polymer that consists essentially of a single monomer type.

The term "copolymer" refers to chains comprising more than one type of monomer unit.

The term "non-homopolymer" refers to a polymer formed from two or more monomers and includes essentially all polymers that are not homopolymers. Nonlimiting examples of non-homopolymers include copolymers, terpolymers, tetramers, and the like, wherein the non-homopolymer is a random, or alternating polymer.

The term "terpolymer" refers to a non-homopolymer that comprises three different monomer types.

The term "polymerization" refers to methods for chemically reacting monomer compounds to form polymer chains. The polymer chain may be alternating, branched, blocked, or random. The type of polymerization method may be selected from a wide variety of methods. Such methods include, but are not limited to, free radical polymerization methods, such as classical radical polymerization and controlled radical polymerization, Nitroxide Mediation Polymerization (NMP), Atom Transfer Radical Polymerization (ATRP), precipitation polymerization, and Reversible Addition Fragmentation Chain-Transfer (RAFT).

The term "precipitation polymerization" refers to a method for preparing polymers as a powder which can be filtered and dried easily; it is available when the monomers are adequately soluble in the reaction solvent and the copolymer is insoluble in the solvent. A commercially successful precipitation polymerization process, however, must provide a precipitate of the copolymer as a powder, in a non-toxic solvent, in high yield, which is easy to filter, and within a desired copolymer compositional range.

The term "M-06" refers to "N-(2-hydroxyethyl)pyrrolidone methacrylate" or "hydroxyethylpyrolidone methacrylate" and these terms are synonymously used in this application, the structure of M-06 (CAS NO: 946-25-8) is provided below:

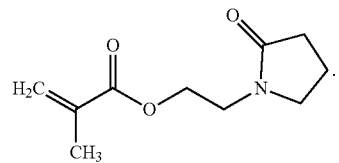

The terms "x" and "y" refer to positive real numbers commonly used in polymers and denote the mole % of each monomer, and in the present invention, the sum of x and y equals 100.

All percentages, ratio, and proportions used herein are based on a weight basis unless other specified.

The present application provides reactive, flexible, water-resistant hydroxyethylpyrrolidone methacrylate/glycidyl methacrylate copolymers having the structure:

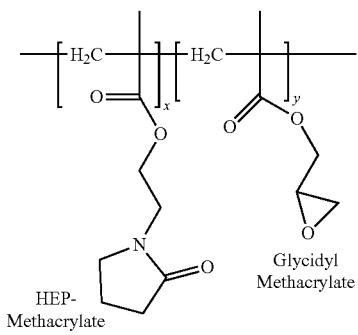

HEP-Methacrylate    Glycidyl Methacrylate wherein x and y are mole %, the sum equals to 100, and wherein said copolymer is prepared by precipitation polymerization.

The present application provides copolymers comprising vinyl lactams and vinyl glycidyl acrylates. The vinyl lactams, which have hydrogen bond/complex abilities, may comprise vinyl pyrrolidone, vinyl caprolactam, hydroxyalkyl-pyrrolidone-(meth)acrylates, hydroxyalkyl-pyrrolidone-(meth)acrylamides, and the like. The vinyl glycidyl acrylates, which contain a reactive epoxy-functionality, have the ability to covalently bond to a polymer. A preferred vinyl glycidyl acrylate is glycidyl methacrylate. By covalently bonding to the polymer, the polymeric water-soluble or water-dispersible complex will not be available to be washed away when exposed to aqueous solution.

In particular embodiments, the monomer having at least one functionalized or unfunctionalized acryloyl moiety and at least one lactam moiety has a structure selected from the group consisting of:

(2)
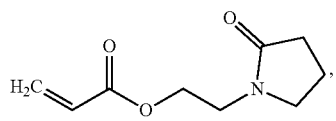

(3)
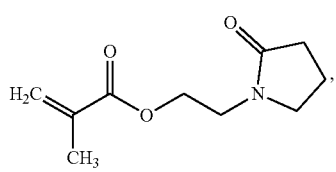

(4)
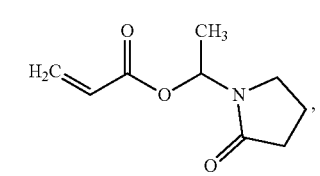

(5)
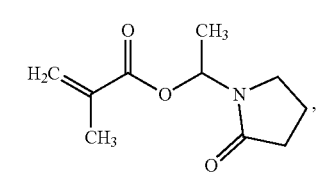

(6)
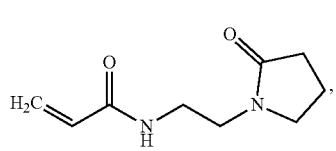

(7)
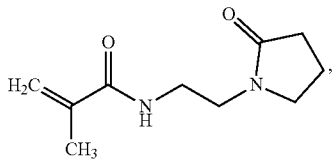

(8)
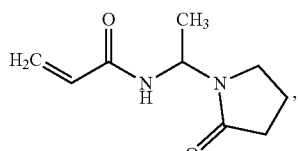

(9)
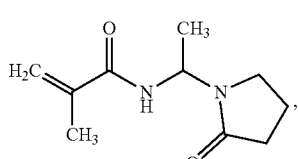

(10)
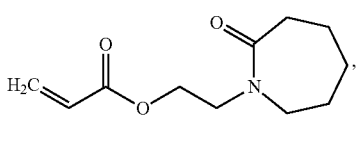

(11)
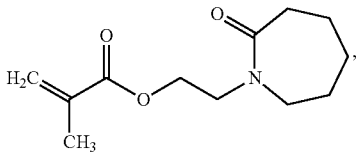

(12)
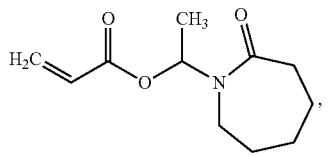

(13)
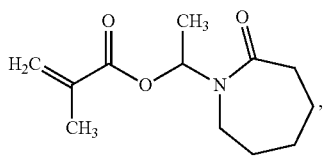

(14)
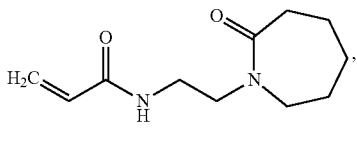

(15)
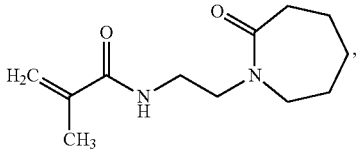

(16)
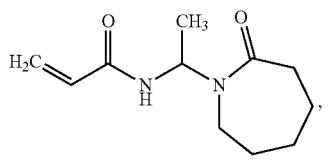

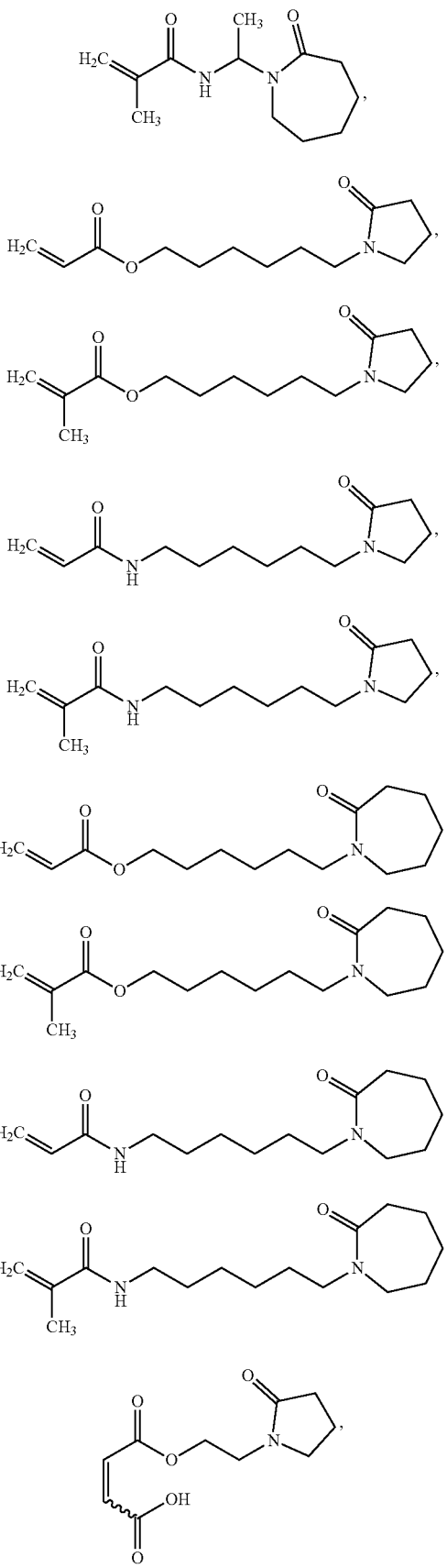
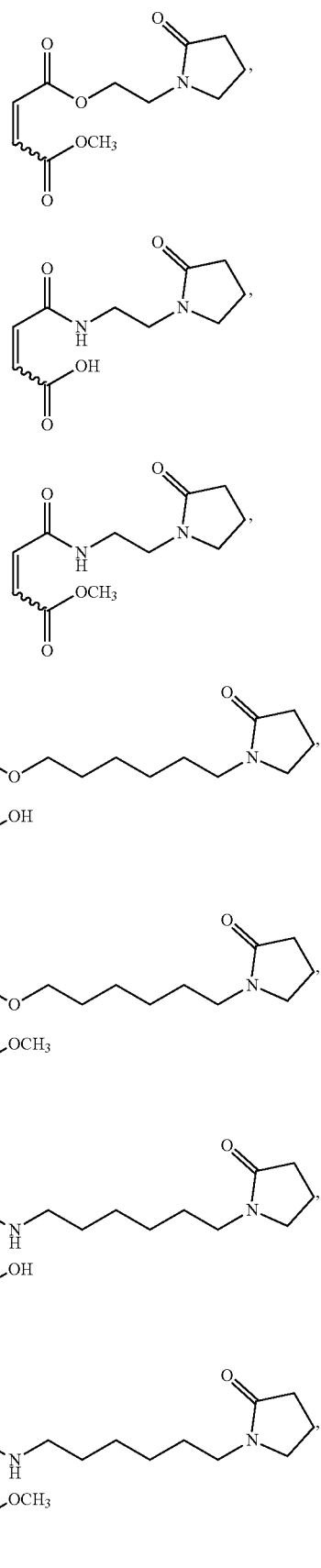

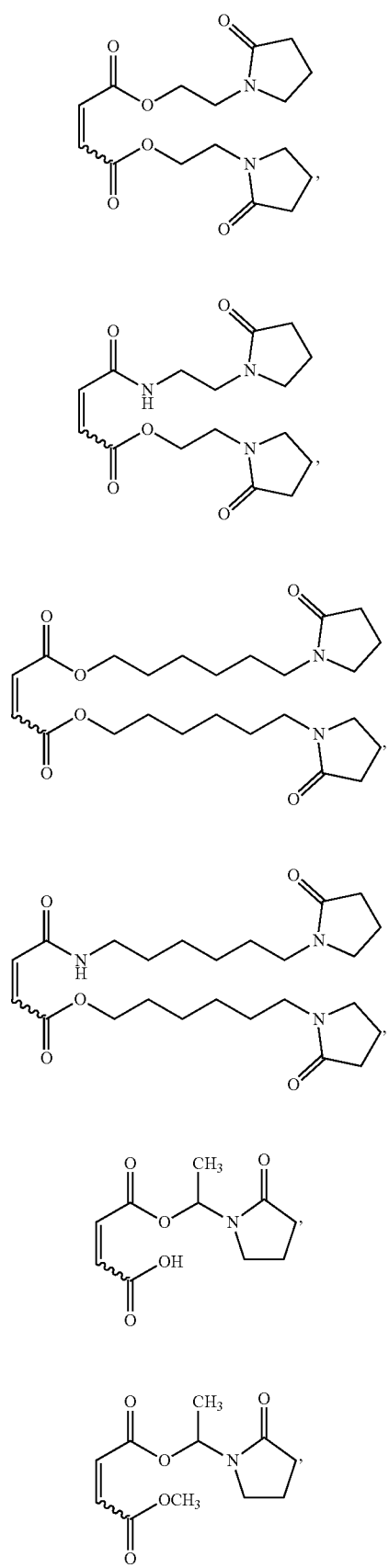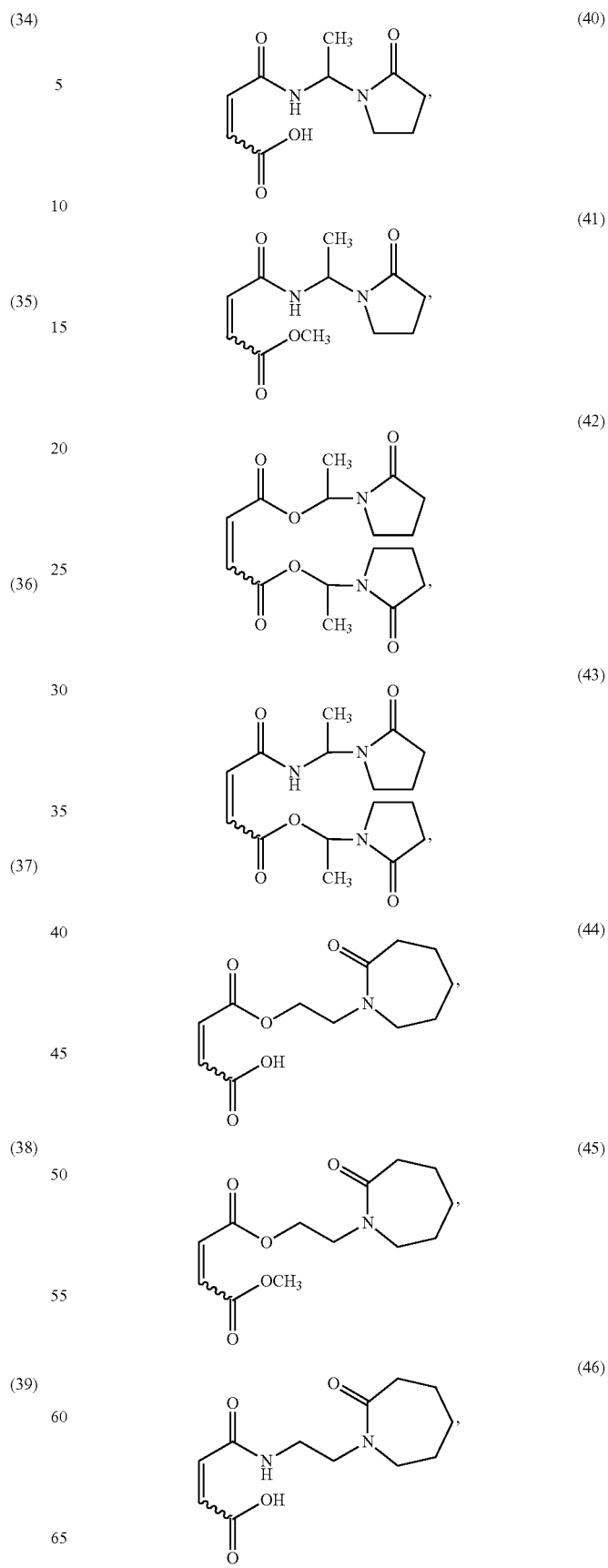

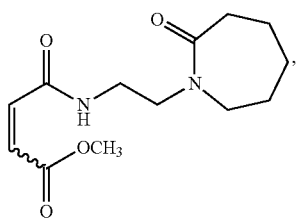
(47)

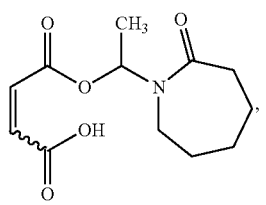
(48)

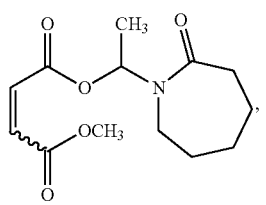
(49)

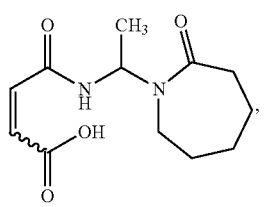
(50)

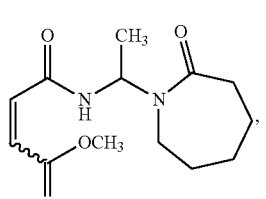
(51)

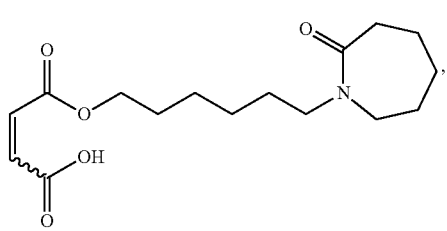
(52)

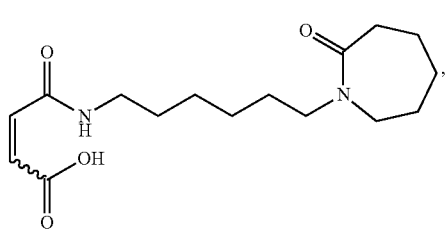
(53)

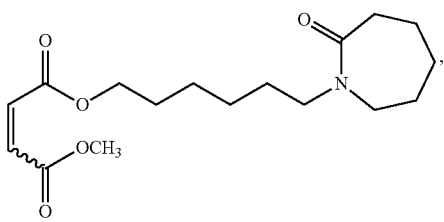
(54)

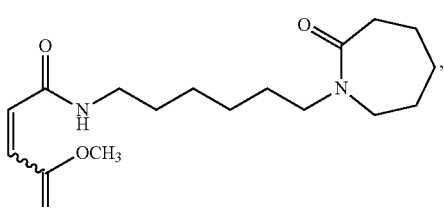
(55)

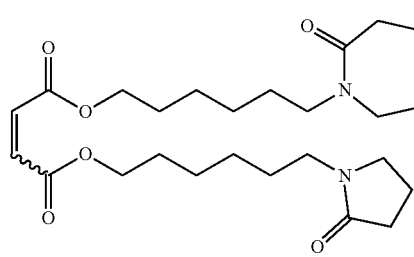
(56)

, and

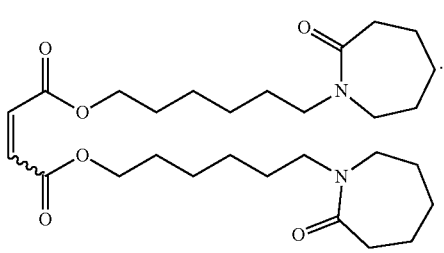
(57)

Other suitable examples of can be found in WO 2011/063208, the disclosure of which is hereby incorporated herein by reference in its entirety.

Preferably, the vinyl lactam is hydroxyethylpyrrolidone methacrylate, set out below,

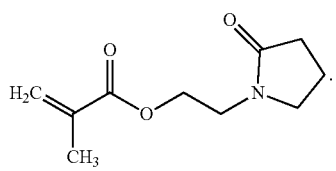
(58)

The present application provides reactive, flexible, water-resistant hydroxyethylpyrrolidone methacrylate/glycidyl methacrylate copolymers having the structure:

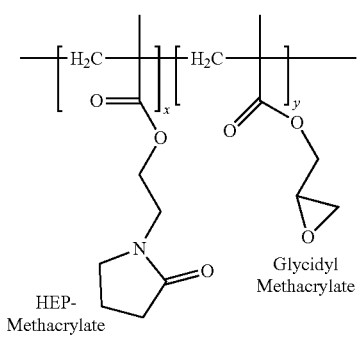

wherein x and y are mole %, the sum equals to 100, said copolymer is prepared by precipitation polymerization, and x ranging from about 5 to about 98 and y is ranging from about 2 to about 95.

The present application provides reactive, flexible, water-resistant hydroxyethylpyrrolidone methacrylate/glycidyl methacrylate copolymers having the structure:

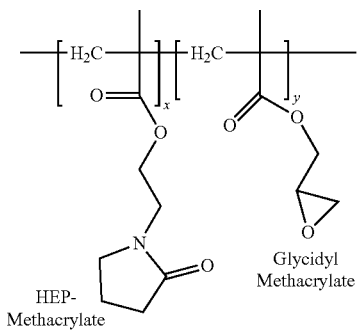

wherein x and y are mole %, the sum equals to 100, said copolymer is prepared by precipitation polymerization, and x is ranging from about 10 to about 90 and y is ranging from about 10 to about 90.

According to one of the embodiment, the polymerization process to prepare the copolymers is precipitation polymerization.

The precipitation polymerization process of the present application can provide the copolymer in a yield of 80% or more, preferably 90-98%, as a powder, which powder can be filtered and recovered easily.

The reaction solvent in the precipitation polymerization process of the invention suitably is a $C_3$-$C_{10}$ saturated hydrocarbon which is branched or unbranched, cyclic or acyclic. Preferably the solvent is a $C_5$-$C_8$ aliphatic hydrocarbon or mixtures thereof.

A preferred aliphatic hydrocarbon solvent over other known precipitation polymerization solvents is selected from acetone, hexane, ethyl acetate, heptane and cyclohexane. Acetone and cyclohexane are the most preferred solvents, provides high yields of a precipitate of the desired terpolymer composition as a fine white powder which is easy to filter and dry.

The amount of solvent used in the process of the invention should be sufficient to dissolve an appreciable amount of the reactants and to maintain the copolymer precipitate in a stirrable state at the end of the polymerization. Generally, up to about 40% solids, preferably 15-20% solids, is maintained in the reaction mixture to avoid the formation of large agglomerates/"rocks".

The precipitation polymerization process of the invention is carried out in the presence of a polymerization initiator, preferably a free radical initiator, and most suitably, a peroxy ester, e.g. t-butylperoxy pivalate, although other free radical initiators such as acylperoxides, alkyl peroxides, hydroperoxides, nitroxides, organometallics, persulfates, percarbonates, Type-I and Type-II-photo-initiators, peracids, thiocarbamates, azo-compounds, and azonitriles, known in the art, may be used as well.

The amount of such initiator may vary widely; generally, about 0.2-5.0% is used, based on the weight of total monomers charged.

The reaction temperature may vary widely; generally, the reactants are maintained at about 50°-150° C., preferably 60°-70° C., during the polymerization. Pressure usually is kept at atmospheric pressure, although higher and lower pressures may be used as well.

The reaction mixture should be stirred vigorously under an inert atmosphere, e.g. nitrogen, during the polymerization. A stirring rate of about 400-600 rpm in a 1-liter lab reactor is quite adequate to effect the desired polymerization and to keep the precipitate in a stirrable state during the polymerization.

The precipitation polymerization process of the invention may be carried out by first precharging a suitable reactor with a predetermined amount of hydroxyethylpyrrolidone methacrylate in the aliphatic hydrocarbon solvent, and heating the mixture to the desired reaction temperature while stirring vigorously under an inert gas atmosphere. The initiator is then charged into the reactor, and immediately a preselected amounts of glycidyl methacrylate and hydroxyethylpyrrolidone are added into the reactor over a period of time, generally about an hour or more. The reaction mixture then is held for an additional period of time for polymerization to occur. Finally, the slurry is cooled to room temperature. Filtering, washing with solvent, and drying provide the copolymer in yields approaching quantitative, and, substantially, in a composition predetermined by the weight ratio of monomers introduced into the reactor.

Alternatively, the aliphatic hydrocarbon solvent can be precharged into the reactor, purged with nitrogen, heated to the reaction temperature, the initiator added, and then separate streams of the hydroxyethylpyrrolidone methacrylate and glycidyl methacrylate monomer can be introduced over a period of time into the precharged reactor. Other process variations will be apparent to those skilled in the art.

According to one of the embodiment, the present application provides a process to prepare a copolymer comprising: a) charging one or more solvent to a reaction vessel equipped with an anchor agitator; b) heating the solvent to reach temperature between 65° C.-95° C.; c) purging nitrogen gas to the solvent with continuous agitation; d) feeding the reaction vessel with a predefined molar ratio of hydroxyethylpyrrolidone methacrylate (M06) and glycidyl Methacrylate (GMA); e) charging one or more initiator to the reaction mixture of d); f) polymerizing the reaction mixture of e) for at least 30 minutes; g) recovering copolymer from step f) in solid form.

According to one of the embodiment, the present application provides a composition comprising: a) hydroxyethylpyrrolidone methacrylate/glycidyl methacrylate copolymer having the structure:

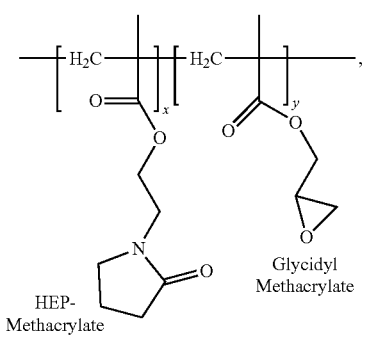

wherein x and y are mole %, the sum equals to 100, and wherein said copolymer is prepared by precipitation polymerization; and b) one or more additive raning from about 0.1 to about 99 wt % of the total composition.

According to one of the embodiment, the additive contains a reactive oxygen atom, nitrogen, sulfur, an aliphatic and/or aromatic organic radical that is linear, cyclic, and/or heterocyclic in nature.

According to one of the embodiment, an additive comprising z wt % whose sum of x, y and z equals 100 wt %. Preferable ranges of z span 0.1-99 wt %. The additive must contain a reactive: oxygen atom, and/or nitrogen, and/or sulfur, and/or an aliphatic and/or aromatic organic radical that is linear and/or cyclic, and/or heterocyclic in nature.

Suitable additives include: crosslinkers, biofunctional peptide, polypeptide, protein, glycol-protein, lipo-protein, a DNA, an RNA, a pharmaceutical active, a sunscreen, a polysaccharide, a starch, a hexose, a pentose, a tetrose, or a natural or synthetic polymer such as; cellulosics, maleic anhydride-copolymers, itaconic anhydride-copolymers, polyterphtalates, polyalkyds, polyester, polyurethane, polyether, epoxy, gypsum, nylon, poly-(meth)acrylate, poly-(meth)acrylamide, polyethyleneglycol, polypropyleneglycol, polysiloxane, polydimethylsiloxane, silicone, poly-olefin, polyvinyl ether, polystyrene, polysulfone, polyamide, poly-lactam, poly-vinyl-substituted-monomer(s) such as: polyvinylacetate, or polyvinyl-alcohol, polyvinylpyrrolidone, polyvinylcaprolactam, PVP-VA, PVP—VOH, PVP-PVCAP, PVC, polyvinylformamide, polyvinyl imidazole, polyvinyl acetamide, polyvinyl chloride, and/or combinations of monomers and polymers thereof, and/or combinations of any of the compounds listed above. Therefore, the additive can be any natural and/or synthetic agent bearing a reactive: oxygen, nitrogen, sulfur, or carbon atom within the molecule.

The copolymer composition of the present invention is suitable for use in a wide variety of compositions including industrial, personal care, household, and pharmaceutical applications. Industrial uses include, but are not limited to, formulating inks, flocculation agents, hydrogels, gel forming materials, surface modification compositions, coatings, microporous print media, paper sizing additives, shale swell inhibitors, metal coatings, metal working fluids, ceramics, rheology modifiers, reactive biocides, decorated titanium, interlaminate adhesives, agricultural compositions, dispersants, batteries, products comprised of iodine, products comprised of silver, products comprised of carbon and graphene, products comprised of nano carbons, comb/branch polymer adducts, biocidal films, tackifiers, latex weather resistant modifiers, decorated pigments for inks and pastes, decorated cenospheres, decorated barium sulfate, cross-linkers, automotive products and protective films, super-absorbers (i.e., diapers) (see U.S. Pat. App. 2009/0043005A1, the contents of which are hereby incorporated by reference), printing plates, macro-initiating materials, products comprised of graphene, hydrophilic enhancement agents for membranes (see U.S. Pat. App. Ser. No. 61/242,900 and PCT/US/2010/028852, the contents of which are hereby incorporated by reference), anti-fog coatings, polymer blocks, additives to extrudable compounds and films, protective colloidal agents, multi dimensional printing materials including pigments, polymers and inks (for example see WO/2008/077850A2, the contents of which are hereby incorporated by reference), refractive index modifiers, cross-linking agents, microencapsulation particles and additives (see U.S. Pat. No. 5,811,121 and WO 2007/146722 A1), rheology control agents, grease resistant paper and films, fiber sizing agents, products comprised of alumina, conductive films, cementitious compositions, bioadhesives, tablet coatings, battery binders, resinous UV absorbers (U.S. patent application Ser. No. 12/698,583, the contents of which are hereby incorporated by reference), iodine stabilizers, conductive coatings and gels, reactive rheology modifying agents, macro-initiators, coating flex agents, and non-migratory anti-static agents. Personal care and household applications include, but are not limited to, formulating cosmetics, hair care products, oral care and dentifrices, toiletries, hydrogels, laundry products and household cleaning products, and dye absorbent non-woven swatches. Pharmaceutical applications include, but are not limited to, processing aids, medical stents, lubricity modification agents, catheters and other medical device coatings, active ingredient solubilizers, adhesive patches, optical lenses, formulating drug delivery systems, and preparing tablet coatings.

The polymer is suitable to modify the surface of active agents include; modified silicones, poly-dimethylsiloxane, hair-dyes, UV-filters, conditioning agents, vitamins, peptides, enzymes, microbiological agents, cleansing agents, fragrances, medical coatings or devices, pharmaceutical actives, oncology agents, therapeutic agents and therapeutic-peptides/polypeptides, pigments, dyes, colorants and inks, polymeric binders, formation of block-copolymers and hybrid-polymer compositions with other industrially significant polymers and copolymers such as (meth)acrylates and/or (meth)acrylamides, cellulosics, starches, polyesters, polyamides, vinyl-polymers, proteins, guar, poly-olefins and their chemically modified counterparts. Once the active agent is attached to the copolymer, the attachment provides a means to cross-link with other substrates and/or itself, so that it is (semi)permanently attached to the surface of the substrate by a covalent bond, that has a reactive nucleophilic or electrophilic atom within it, and/or can be encased by the crosslinked polymer-active matrix itself.

Hair-dyes leach from dyed hair over time. The present copolymers can bind hair dyes to hair substrates through covalent bonds that cannot be leached. The present copolymers provide a means to react hair-dyes and printing dyes onto the present copolymers so that when they contain an inorganic or organic OH, SH, NH, or an acidic hydrogen like inorganic and organic acids, or active-hydrogen compounds like Michael-donors or acceptors, or any nucleophilic or electrophilic functionality capable of reacting with the epoxy-functionality, the hair and printing dyes will be permanently bonded to the copolymers. Upon further cross-linking, a crosslinked matrix of active agents and copolymers result in (semi)permanently fixed to the substrate in one step or multiple steps.

When poly-dimethylsiloxane is mixed with an aqueous copolymer formulation, the dispersion formed phase-separates into an oily layer and an aqueous layer within minutes. However, when poly-dimethylsiloxane is reacted with the present copolymers, the terminal hydroxyl or amino-functionality of these modified silicones can attach to the epoxy functionality thereby making them more water dispersible and stable as micro-emulsions.

Accordingly, the present application also provides a universal surface modification composition, or delivery system, comprising the present copolymer. The present copolymer composition is reacted with useful actives and simultaneously or sequentially crosslinked onto a substrate under mild conditions. The invention also provides a means to decay the composition into a non-toxic glycerol entity, when not used or reacted with another agent so form environmentally friendly and green compositional by product results.

According to one of the embodiment, the copolymer according to present application is useful as an ingredient in coating compositions along with one or more polymeric binders, pigments, fillers, and surfactants.

Polymeric binders, also referred to as emulsions, latexes, adhesives, glues, dispersions, or resins, are versatile systems in the construction and design of polymers. Examples of suitable binder classes include vinyl esters of versatic acid (VeoVa), styrene butadiene rubber (SBR) latex, styrene acrylate, polyvinyl alcohol and copolymers, polyvinyl acetate copolymers, vinyl acetate copolymers, carboxylated SBR latex, polyolefins and copolymer of polyolefins (i.e.; poly(ethylene-co-acrylic acid) and poly(ethylene-co-vinyl acetate)), styrene acrylate copolymers, styrene/butadiene/acrylonitrile, styrene/butadiene/acrylate/acrylonitrile, polyalkylene imines, polyvinyl pyrrolidone and copolymers, polyurethanes, polyamines, polyamides, cationic polyurethanes, polyethylene oxide, poly(2-ethyl-2-oxazoline), polyester resins, gelatins, casein, alginate, cellulose derivatives, hydroxyethyl cellulose, ethyl cellulose, hydroxypropyl cellulose, starches, ethoxylated, oxidized and enzyme converted starches, cationic starches, guar, cationic guar, water soluble gums, acrylic vinyl polymers, soy protein polymers as well as mixtures of water soluble and water-insoluble resins, latexes may be used. Latex binders are most commonly emulsions (polymer particles suspended in a liquid medium).

Preferably, a binder is present in the coating compositions of the invention. A preferred binder is a vinyl acetate-ethylene copolymer, such as Vinnapas® 465 Emulsion, available from Wacker Chemie, AG. Vinnapas® 465 Emulsion is a rapid-setting vinyl acetate-ethylene copolymer, which is a high-solids emulsion. This emulsion combines a high-solids content with a low viscosity, which is a combination that permits the addition of high-filler loadings, resulting in adhesive formulations with solid contents of 80%, or more. Furthermore, this emulsion does not thicken excessively on the addition of plasticizers, which allows for the formulation of very high-solids adhesives. Vinnapas® 465 Emulsion also is shear stable, and can be applied on high-speed packaging machines using roll, extrusion, or spray equipment. The emulsion dries to a slightly tacky, clear, water-resistant film. Another preferred binder is Witcobond W-213 polyurethane dispersion, available from Uniroyal Chemical. Witcobond W-213 polyurethane dispersion is a waterborne, cationic dispersion from aliphatic urethanes. Strong, cohesive films can be produced simply by the evaporation of its water content. Witcobond W-213 polyurethane dispersion is used with cationic additives as a protective coating or surface treatment, where the properties of a light stable, waterborne urethane are suitable, primarily for textiles, nonwovens, fiberglass, paper, wood, urethane foam, or other porous substrates. The copolymer in coating compostion adheres well to various substrates such as polyester, poly(ethylene terephthalate), tempered aluminum foil and polystyrene.

Preferably a pigment or pigments (colorant or colorants) are used in the coating compositions of the invention. Suitable pigment materials are described in Hunger's "Industrial Organic Pigments," Itoh's "Dictionary of Pigments," and Leach and Pierce's "Printing Ink Manual." Pigment can be added by mixing components. Pigment or pigments may be added with a plasticizer and/or a filler. The exact choice and amount of pigment will depend upon the final desired coating composition and such information is well known in the art.

Preferably a surfactant is used in the coating compositions of the invention. Surfactants (wetting agents, are compounds that lower the surface tension of a liquid, the interfacial tension between two liquids, or that between a liquid and a solid. Surfactants may act as detergents, emulsifiers, foaming agents, and dispersants. Surfactants are usually organic compounds that are amphiphilic, meaning they contain both hydrophobic groups and hydrophilic groups. Therefore, a surfactant contains both a water-insoluble (or oil-soluble) component and a water-soluble component. Surfactants will diffuse in water and adsorb at interfaces between air and water or at the interface between oil and water, in the case where water is mixed with oil. The insoluble hydrophobic group may extend out of the bulk water phase, into the air or into the oil phase, while the water-soluble head group remains in the water phase. This alignment of surfactants at the surface modifies the surface properties of water at the water/air or water/oil interface. The exact choice and amount of surfactant will depend upon the final desired coating composition and such information is well known in the art.

Other suitable components for aqueous based coatings of this invention include silicates and silica gels, free radical initiators, aluminates and aluminas, N-vinyl-2-pyrrolidone, N-vinyl-caprolactam, other N-vinyl amides, 1-vinyl imidazole, 4-acryloyl morpholine, polyvinyl pyrrolidone, polyvinyl alcohol, acetoacetylated polyvinyl alcohol, oxygen scavengers, styrene/acrylate latexes, acrylic latexes, polyalkylene glycols, maleic anhydride-co-methyl vinyl ether polymers, polyalkylene imines, oxetanes, oxazolines, benzoxazines, polydi allyldialkylammonium chloride materials, starch, acrylated epoxides, glycidyl acrylate monomers, polyurethanes, acrylated oligomers of polyurethanes, acrylated glycidyl oligomers, polyfunctional acrylates, polyfunctional aziridines, clays, calcium carbonates, talcs, cellulosics, cycloaliphatic epoxides, vinyl ethers, epoxy based dispersions, anionic surfactants (i.e., sodium lauryl sulfate), non-ionic surfactants, cationic surfactants, silanes or silicone based polymers, and anionic polyacrylates, such as polyacrylic acid. Optional components in the composition for optimization of the coating composition when coated on different substrates include pigments, clays, e.g. organoclays and water-swellable clays, acrylic polymers, acrylic copolymers, alginates, carrageenan, microcrystalline cellulose, gelatin, carboxymethylcellulose sodium, hydroxyethylcellulose, hydroxypropylcellulose, hydroxypropylmethylcellulose, methylcellulose, guar and guar derivatives, locust bean gum, polyethylene oxide, polyvinylpyrrolidones, copolymers of polyvinylpyrrolidones, polyvinylalcohols, charge control agents, optical brighteners, other water soluble polymers, silicas, aluminates, zirconates, calcium carbonates, xanthan gums, polymers or copolymers of water soluble vinyl lactams optionally having in situ-formed particles of crosslinked vinyl lactam polymers or copolymers, crosslinked polyvinyl pyrrolidone, and crosslinkers to achieve advantageous printable surface coatings having light stability (see U.S. Pat. No. 6,872,787 B2). Preferred components and optimal amounts of these components will depend upon the specific support coating and application and can be readily determined by one of ordinary skill in the art.

Colloidal silica, amorphous colloidal silica particles may be included, e.g. 20-150 nm. Preferred colloidal silicas are Silcron IJ-25 and IJ-50. Silica gels, amorphous colloidal silica particles, may also be included, e.g., 4-7 microns. A preferred silica gel is Silcron G 100.

The present invention also relates to curing or cross-linking or polymerizing a polymerizable material carried out by any appropriate method known in the arts. Insight into curing and cross-linking technology is disclosed in "Thermosetting Polymers," J. P. Pascault et. al. (Marcel Dekker, New York, 2002), which disclosure is incorporated by reference herein. The polymerization of reactive solution comprising polymerizable polymer may be carried out by employing any of the methods disclosed in "Principles of Polymerization 4th edition," by George Odian (J. Wiley and Sons, Hoboken, N.J., 2004), which disclosure is incorporated by reference herein. The preferable techniques or methods employed by the present invention to polymerize the polymers would include UV-radiation, UV-LED, laser beam, electron beam, gamma irradiation, free-radical, cationic, anionic, thermal, exposure to e-beam and/or by employing a high-energy source in presence of suitable photo initiator for the initiation of polymerization. Suitable sources of radiation include, but are not limited to, mercury, xenon, halogen, carbon arc lamps, sunlight, and radioactive sources.

Radical, thermal, or chemical crosslinking reactions obviate the problems and issues of high viscosity and uneven application of the crosslinked formulation and the disposal and cleaning of the non-biodegradable crosslinked copolymer formulations. When the unused or unreacted composition is simply exposed to water or moisture for several weeks, it renders the reactive epoxy-functionality into a stable non-toxic glycerol moiety so it is ecologically friendly to the environment.

In order to induce polymerization via irradiation, photoinitiators are often incorporated to initiate the polymerization reaction system. Preferable photoinitiators are selected from the following non-limiting group or class of compounds such as 2-hydroxy-2-methyl-1-phenylpropane-1-one, 1-hydroxycyclohexyl phenyl ketone, and 2-methyl-1-[4-(methylthio)phenyl]-2-morphorinopropane-1-on; benzoins e.g. benzyl dimethyl ketal; benzophenones such as benzophenone, 4-phenylbenzophenone, and hydroxybenzophenone; thioxanthones such as isopropylthioxanthone and 2,4-diethylthioxanthone; acylphosphine oxides; and other special initiators such as methyl phenyl glyoxylate; bis[4-(di(4-(2-hydroxyethyl)phenyl)sulfonio)phenyl sulfide], a mixture of bis[4-diphenylsulfonio]phenyl sulfide bis(hexafluoroantimonate and diphenyl-4-thiophenoxyphenylsulfonium hexafluoroantimonate, bis[4-(di(4-(2-hydroxyethyl)phenyl)sulfonio)phenyl sulfide], 5-2,4-cyclopentadiene-1-yl-[(1,2,3,4,5,6-.eta.)-(1-methylethyl-)benzene]-iron (1+)-hexafluorophosphate(1−)), 4-(2-hydroxytetradecanyloxy) diphenyliodonium hexafluoroantimonate, (4-hydroxynaphtyl) dimethylsulfonium hexafluoroantimonate), photo latent bases such as photo latent diazabicyclo nonene, triphenylsulfonium hexafluorophosphate, triphenylsulfonium hexafluoroantimonate, 4-methoxyphenyldiphenylsulfonium hexafluoroantimonate, 4-methoxyphenyliodonium hexafluoroantimonate, bis(4-tert-butylphenyl)iodonium tetrafluoroborate, (bis(4-tert-butylphenyl)iodonium hexafluorophosphate), (bis(4-tert-phenyl)iodonium hexafluoroantimonate), (bis[4-(diphenylsulfonio)phenyl]sulfide bis(hexafluorophosphate)), aryldiazonium salts, diaryliodonium salts, triaylsulfonium salts, triarylselenonium salts, dialkylphenacylsulfonium salts, triarylsulfoxonium salts, triethanol amine, aryloxydiarylsulfonium salts, and the like for example, triphenylsulfonium hexaflurophosphate, methyidiphenylsulfonium hexafluorophosphate, dimethylphenylsulfonium hexaflurophosphate, diphenyinapththylsulfonium hexaflurophosphate, di(methoxynapththyl) methylsulfonium hexaflurophosphate, (4-octyloxyphenyl) phenyl iodonium hexafluoro antimonate, (4-octyloxyphenyl) diphenyl sulfonium hexafluoro antimonate, (4-decyloxyphenyl) phenyl iodonium hexafluoro antimonite, (4-dodecyloxyphenyl)diphenyl sulfonium hexafluoroantimonate. Preferably, the photoinitiator includes 10-biphenyl-4-yl-2-isopropyl-9H-thixanthen-10-ium hexafurophosphate, 4,4'-dimethyl iodonium hexaflurophosphate, mixed triarylsulfonium hexaflurophosphate salts and reaction products of polyol and 10-(2-carboxymethoxy)-biphenyl-4yl-2-isopropyl-9-oxo-9H-thioxanthen-10-ium hexaflruophosphate. The photoinitiators may be used alone or in combinations thereof. Alternatively, the photoinitiator may be used by mixing it with one or more photopolymerization accelerator, such as a benzoic acid (e.g., 4-dimethylaminobenzoic acid) or a tertiary amine (e.g., diazabicyclo nonene (DBN)), in any appropriate ratio. The photoinitiator is preferably added to the photopolymerizable composition in the range of about 0.1% to about 20% by weight.

The conditions of the thermal activation of the present copolymer, exposure to heat 90-230° C., can be achieved easily by a blow-dryer, flat-iron or curling-iron, or calendaring onto the substrate, do not destroy other useful ingredients in the formulation. The conditions for preparing the crosslinkable compositions are very mild and can be performed without the need for specialized equipment or dangerous radiation sources. Addition of other catalysts, such as thermal or photoacids, or thermal/photogenerating radical species, can catalyze the crosslinking reactions by simple exposure to the sun, heat, or other external sources.

The coating composition is also useful in varity of printing applications such as include litho, inkjet, flexographic printing, spraying, inkjet printing, forward or reverse roll coating, direct forward gravure coating, screen printing, hand block printing, perrotine printing, engraved copper plate printing, roller printing, cylinder printing, machine printing, stencil printing or digital textile printing and etc.

The coating composition is useful in variety techniques, which can be reflective or non-reflective these techniques include but are not limited to Chrome plating, Vacuum coating, Spray on chroming, Spray painting, High velocity oxygen fuel (HVOF), Plasma spraying, Thermal spraying, Plasma transferred wire arc thermal spraying, the common forms of Powder coating, Conversion coating, Anodising, Chromate conversion coating, Plasma electrolytic oxidation, Phosphate (coating), Ion beam mixing, Pickled and oiled, a type of plate steel coating, Plating, Electroless plating, Electroplating, Adhesive, Cathodic arc deposition, Electron beam physical vapor deposition (EBPVD), Ion plating, Ion beam assisted deposition (IBAD), Magnetron sputtering, Pulsed laser deposition, Sputter deposition, Vacuum deposition, Vacuum evaporation, evaporation (deposition), Air knife coating, Anilox coater, Flexo coater, Gap Coating, Knife-over-roll coating, Gravure coating, Hot Melt coating, Immersion (dip) coating, Kiss coating, Metering rod (Meyer bar) coating, Roller coating, Forward roller coating, Reverse roll coating, Silk Screen coater, Rotary screen, Slot Die coating, Inkjet printing, Lithography, Hexography, dip coating, Tensioned-web slot die coating, Slot die bead coating, Slide coating, Curtain coating, and Extrusion coating. In addition, other similar techniques may be used.

Copolymers compositions in accordance with the present application may be in the form of a powder, solid, liquid, or solution form. Compositions comprising the copolymer may be curable via ultra violet (UV) radiation, thermal, electron beam, or gamma irradiation. The polymers may be utilized in the formulation of aqueous, UV curable coatings, or in 100% solid, UV curable coatings. Compositions comprising the copolymer may be thermally and/or cationically curable or thermally and/or anionically curable. The polymers or compositions containing the polymers may be thermoplastic polymers that can be produced in either liquid or powder form.

The coating compositions of the invention can provide a glossy, transparent to matte, opaque finish coating on synthetic films such as polyester, vinyl, polyolefins, and the like, as well as paper and canvas.

Generally, the coating composition has a solid content of about a solids content of about 15-50% and a viscosity of about 200-3000 cps.

The copolymer in the coating composition suitably has a K-Value of about 5 to about 100, preferably about 10 to about 70.

The copolymers and their compositions can be prepared according to the examples set out below. The examples are presented for purposes of demonstrating, but not limiting, the preparation of the coating compositions of this invention.

EXAMPLES

The following non-limiting examples are provided to illustrate a few of the methods for preparing the novel copolymers. The examples are presented for purposes of demonstrating, but not limiting, the preparation of the compounds and compositions of this invention.

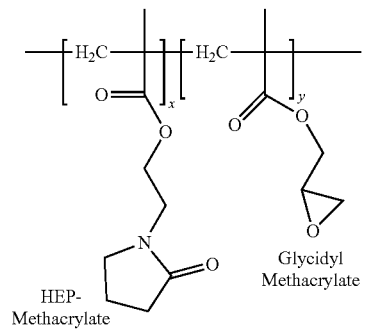

Polyhydroxyethylpyrrolidone methacrylate/glycidyl methacrylate Copolymer

Example 1

(Polyhydroxyethylpyrrolidone methacrylate/glycidyl methacrylate, 95/5) in Acetone In a 1-L resin kettle equipped with an anchor agitator, thermocouple, gas inlet and reflux condenser, 300 g of acetone was charged into the reactor. The reaction mixture was purged with nitrogen for 30 min With agitation and nitrogen purging, the reactor was heated to 65° C., then two feeds of 95 g of HEP-Methacrylate (M06) and 5 g of Glycidyl Methacrylate (GMA) were fed. HEP-Methacrylate (M06) feed was fed over three hours and Glycidyl Methacrylate (GMA) feed was fed over four hours and 0.125 g of Trigonox 25 C75 was charged. After two hours of reaction, 0.125 g of Tirgonox 25 C 75 was charged into the reactor. The reaction was held for 2 hours, and then 0.125 g of Trigonox 250 C75 was charged into the reactor. At time 6, 10 and 12 hours, 0.125 g shot of Trigonox 25 C75 was charged into the reactor respectively. After 14 h, the reaction mixture was cooled to room temperature to discharge the product. The Brookfield viscosity of 5% solution at 25° C. was 170 cps using spindle #1 at 10 rpm.

Example 2

(Polyhydroxyethylpyrrolidone methacrylate/glycidyl methacrylate, 90/10) in Acetone In a 1-L resin kettle equipped with an anchor agitator, thermocouple, gas inlet and reflux condenser, 300 g of Acetone was charged into the reactor. The reaction mixture was purged with nitrogen for 30 min. With agitation and nitrogen purging, the reactor was heated to 65° C., then two feeds of 90 g of HEP-Methacrylate (M06) and 10 g of Glycidyl Methacrylate (GMA) were fed. HEP-Methacrylate (M06) feed was fed over three hours and Glycidyl Methacrylate (GMA) feed was fed over four hours and 0.25 g of Trigonox 25 C75 was charged. After two hours of reaction, 0.125 g of Tirgonox 25 C 75 was charged into the reactor. The reaction was held for 2 hours, and then 0.125 g of Trigonox 250 C75 was charged into the reactor. At time 6, 10 and 12 hours, 0.125 g shot of Trigonox 25 C75 was charged into the reactor respectively. After 14 h, the reaction mixture was cooled to room temperature and discharged. The Brookfield viscosity of 5% solution in acetone at 25° C. was 100 cps using spindle #1 at 10 rpm.

Example 3

(Polyhydroxyethylpyrrolidone methacrylate/glycidyl methacrylate, 80/20) in Acetone In a 1-L resin kettle equipped with an anchor agitator, thermocouple, gas inlet and reflux condenser, 300 g of Acetone was charged into the reactor. The reaction mixture was purged with nitrogen for 30 min With agitation and nitrogen purging, the reactor was heated to 65° C., then two feeds of 80 g of HEP-Methacrylate (M06) and 20 g of Glycidyl Methacrylate (GMA) were fed. HEP-Methacrylate (M06) feed was fed over three hours and Glycidyl Methacrylate (GMA) feed was fed over four hours and 0.125 g of Trigonox 25 C75 was charged. After two hours of reaction, 0.125 g of Tirgonox 25 C 75 was charged into the reactor. The reaction was held for 2 hours, and then 0.125 g of Trigonox 250 C75 was charged into the reactor. At time 6, 10 and 12 hours, 0.125 g shot of Trigonox 25 C75 was added into the reactor respectively. After 14 h, the reaction mixture was cooled to room temperature and discharged. The Brookfield viscosity of 5% solution in acetone at 25° C. was 150 cps using spindle #1 at 10 rpm.

Example 4

(Polyhydroxyethylpyrrolidone methacrylate/glycidyl methacrylate, 99/1) in Acetone In a 1-L resin kettle equipped with an anchor agitator, thermocouple, gas inlet and reflux condenser, 250 g of Acetone was charged into the reactor. The reaction mixture was purged with nitrogen for 30 min With agitation and nitrogen purging, the reactor was heated to 65° C., then two feeds of 99 g of HEP-Methacrylate (M06) and 1 g of Glycidyl Methacrylate (GMA) mixed with 50 g acetone were fed. HEP-Methacrylate (M06) feed was fed over a period of three hours and Glycidyl Methacrylate (GMA) feed was fed over four hours and 0.125 g of Trigonox 25 C75 was charged. After two hours of reaction, 0.125 g of Tirgonox 25 C 75 was charged into the reactor. The reaction was held for 2 hours, and then 0.125 g of Trigonox 250 C75 was charged into the reactor. At time 6, 10 and 12 hours, 0.125 g of Trigonox 25 C75 added into the reactor respectively. After 14 h, the reaction mixture was cooled to room temperature and discharged. The Brookfield viscosity of 5% solution in acetone at 25° C. was 200 cps using spindle #1 at 10 rpm.

While a number of embodiments of this invention have been represented, it was apparent that the basic construction can be altered to provide other embodiments that utilize the invention without departing from the spirit and scope of the invention. All such modifications and variations are intended to be included within the scope of the invention as defined in the appended claims rather than the specific embodiments that have been presented by way of example.

We claim:

1. A hydroxyethylpyrrolidone methacrylate/glycidyl methacrylate copolymer having a structure:

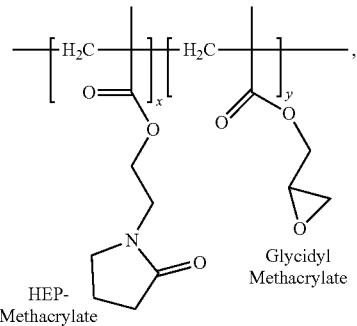

wherein x and y are mole %, the sum equals to 100; and wherein said copolymer is prepared by precipitation polymerization.

2. The copolymer according to claim 1, wherein x ranging from about 5 to about 98 and y is ranging from about 2 to about 95.

3. The copolymer according to claim 1, wherein x is ranging from about 10 to about 90 and y is ranging from about 10 to about 90.

* * * * *